No. 862,786. PATENTED AUG. 6, 1907.
J. V. ASHCRAFT.
MITER JOINT FASTENER.
APPLICATION FILED MAR. 28, 1907.

Witnesses
J. Milton Jester
C. N. Grieshauer

Inventor
Jas. V. Ashcraft
by H. B. Willson & Co.
Attorneys

UNITED STATES PATENT OFFICE.

JAMES V. ASHCRAFT, OF HAZEL HURST, PENNSYLVANIA.

MITER-JOINT FASTENER.

No. 862,786.  Specification of Letters Patent.  Patented Aug. 6, 1907.

Application filed March 28, 1907. Serial No. 365,108.

*To all whom it may concern:*

Be it known that I, JAMES V. ASHCRAFT, a citizen of the United States, residing at Hazel Hurst, in the county of McKean and State of Pennsylvania, have invented certain new and useful Improvements in Miter-Joint Fasteners; and I do declare the following to be a full, clear, and exact description of the invention, such as will enable others skilled in the art to which it appertains to make and use the same.

This invention relates to miter joint fasteners.

The object of the invention is to assemble two members at an angle to each other in such manner as to insure a firm and rigid joint, and one that will not work loose, and to secure these results without the employment of nails, screws, or the like.

With the above and other objects in view, as will appear as the nature of the invention is better understood, the same consists in the novel construction and combination of parts of a miter joint fastener, as will be hereinafter fully described and claimed.

Figure 1:
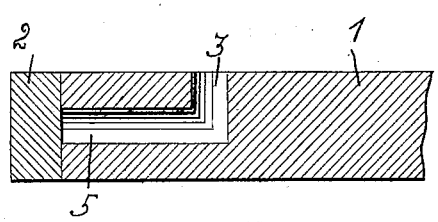
Figure 2:
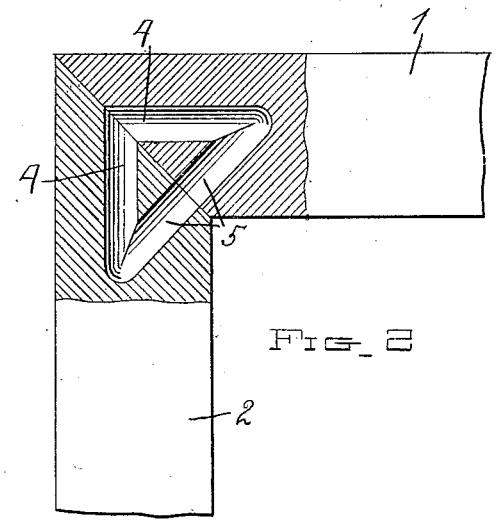
Figure 3:
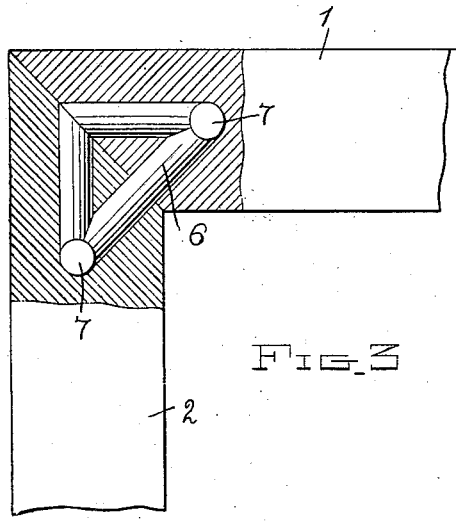
Figure 4:
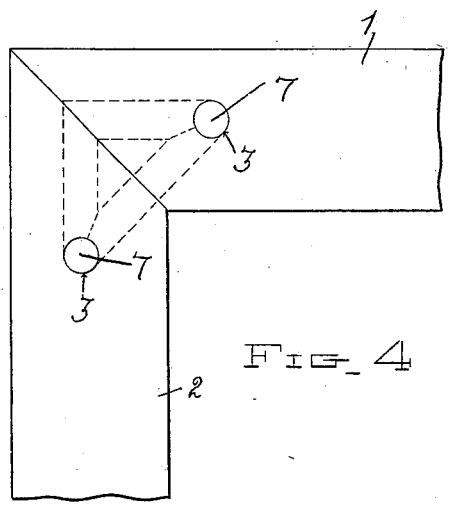

In the accompanying drawings forming a part of this specification, and in which like characters of reference indicate corresponding parts, Figure 1 is a view in longitudinal section through one member of a joint, showing the initial preparation member to receive the fastener; Fig. 2 is a plan view, partly in section, showing two members assembled prior to being secured together; Fig. 3 is a similar view showing the completed joint; and Fig. 4 is a similar view exhibiting the appearance of the joint after the fastener has been completed.

Before describing the invention it is to be noted that while but one form of joint is herein shown, the invention will not be limited thereto, as the invention may be carried out in many obvious ways without departing from the spirit of the invention; furthermore, while not shown, the novel fastener can be used for any beveled joint, but not necessarily one in which the members occupy the position at right angles to each other, or it may be employed in forming a butt joint.

Referring to the drawings, 1 and 2 designate respectively the two members to be united, which may be sections of the picture frame or any other similar object.

In carrying out the invention, after the members have been cut at the proper angle to form the desired joint, an orifice 3 is bored transversely of each member, and about half-way, more or less, through the same. Then through the beveled edge of each member, two orifices 4 and 5 are bored which intersect the orifice 3, as clearly shown in Fig. 3. The two members will be properly clamped together to insure a close union, and then molten metal, such as Babbitt metal, lead, or block tin is poured into the orifice 3 and enters the orifices 4 and 5, wedging the joint at two points, and forming, in this instance, a triangular lock 6. The lugs 7 formed by pouring the metal into the orifice 3, are then dressed down and present the appearance shown in Fig. 4. As is well understood, molten metal upon cooling contracts and this contraction will operate to draw the members 1 and 2 firmly together and thereby present a neat, close, and finished joint.

Of course, the filling of the metal will take place preferably at the back of the frame or other object, so that when the article is completed, the lugs 7 will be invisible.

Having thus described my invention, what is claimed as new is,—

1. The combination of two juxtaposed members, the opposed faces of each having a plurality of inwardly extending channels arranged in the interior of the members and converging therein toward each other and merging into a channel extending at an angle thereto transversely of said member and opening through one face thereof, the channels in the opposing faces of one member registering with those in the other member, and a fastener consisting of a body of metal cast into said channels and bridging the meeting edges of the members.

2. The combination of two juxtaposed members having their opposed faces provided with a plurality of interior channels, those in one member registering with those in the other and having orifices extending transversely of the members and intersecting the channels, and a fastener consisting of a body of metal cast into the channels.

3. The combination of two juxtaposed members having inwardly extending channels opening through the opposed faces thereof, those in one member registering with those in the other and forming together a continuous triangular channel, each member having a channel extending transversely thereof and opening through one of its faces and intersecting said first-mentioned triangular channel at one of its angles, and a fastener consisting of a body of metal cast into the channels.

In testimony whereof I have hereunto set my hand in presence of two subscribing witnesses.

JAMES V. ASHCRAFT.

Witnesses:
 ARTHUR S. M. HOPKINS,
 RUDOLPH GOUTIERE.